United States Patent [19]

Kallergis

[11] Patent Number: 4,607,528
[45] Date of Patent: Aug. 26, 1986

[54] METHOD OF DETERMINING A CLEAN PROPELLER PRESSURE SIGNAL FROM A PROPELLER/ENGINE EXHAUST COMBINED SIGNAL MEASURED IN FLIGHT WITH A MICROPHONE ARRANGED ON A PROPELLER-DRIVEN AIRCRAFT

[75] Inventor: Michael Kallergis, Braunschweig, Fed. Rep. of Germany

[73] Assignee: Deutsche Forschungs- und Versuchsanstalt fur Luft- und Raumfahrt e.V., Fed. Rep. of Germany

[21] Appl. No.: 710,055

[22] Filed: Mar. 11, 1985

[30] Foreign Application Priority Data

Mar. 15, 1984 [DE] Fed. Rep. of Germany ....... 3409487

[51] Int. Cl.$^4$ ........................................... G01N 29/00
[52] U.S. Cl. ..................................... 73/602; 73/646; 73/660; 381/71
[58] Field of Search .................. 73/646, 647, 660, 503, 73/602; 416/61; 381/71

[56] References Cited

U.S. PATENT DOCUMENTS 3,844,175 10/1974 Hixson .................................. 73/647
4,061,041 12/1977 Fletcher et al. ...................... 73/646

FOREIGN PATENT DOCUMENTS 3213127 10/1983 Fed. Rep. of Germany ........ 73/583

Primary Examiner—Anthony V. Ciarlante
Attorney, Agent, or Firm—Salter & Michaelson

[57] ABSTRACT

A method of determining in a propeller-driven aircraft a propeller pressure signal from a combined signal derived from the propeller and from the engine exhaust during flight. Where the propeller driven aircraft is powered by a four-stroke internal combustion engine, pressure signals from the propeller and the engine exhaust coincide where the number of propeller blades corresponds to half the number of cylinders in the engine. In order to determine the clean propeller signal from a propeller/engine exhaust combined signal, a succession of combined signals are detected by means of a microphone arranged on the wing of the aircraft behind the plane of rotation of the propeller. In addition to this, the exhaust signals of the individual engine cylinders are measured at the mouth of the exhaust pipe. Both the combined and the cylinder exhaust signals are recorded synchronously on a multi-track tape recorder. In order to determine the clean propeller pressure time history, the combined and/or cylinder exhaust signals are adjusted to a correct amplitude, similar edges of the combined signals and the cylinder exhaust signals corresponding to respective combined signals are brought into coincidence and the cylinder exhaust signals of the engine are subtracted from the combined signals by electronic means.

7 Claims, 3 Drawing Figures

METHOD OF DETERMINING A CLEAN PROPELLER PRESSURE SIGNAL FROM A PROPELLER/ENGINE EXHAUST COMBINED SIGNAL MEASURED IN FLIGHT WITH A MICROPHONE ARRANGED ON A PROPELLER-DRIVEN AIRCRAFT

The invention refers to a method of determining a propeller pressure signal or time history from a propeller/engine exhaust combined signal measured in flight with a microphone arranged on a propeller-driven aircraft, whereby the combined signal detected by the microphone is recorded.

DESCRIPTION OF THE PRIOR ART

In a known method of this type (Journal of Aircraft, Volume 18, June 1981, pages 480 to 486), concerned with combinations of a four cylinder, four-stroke internal combustion engine with a twin bladed propeller and a six cylinder, four-stroke internal combustion engine with a three bladed propeller, the characteristic frequencies of the sound of the rotating propeller and the cylinder exhaust signal overlap, with the result that it is difficult to separate the sources of noise signals. In the known method two successive measurements are made, the second measurement involving the propeller being shifted by half a phase relative to the engine shaft. The measured signals are then processed in the usual way and are subject to a frequency analysis. In this way it is not possible to determine the clean propeller pressure signal both quantitatively and in a way which can be reproduced.

The object of the invention is a method by which it is possible to determine quantitatively the clean propeller pressure signal from the propeller/cylinder exhaust combined signal.

SUMMARY OF THE INVENTION

This problem is solved according to the invention in that in additional to the combined signal the exhaust signals from the individual cylinders of the engine are measured near the mouth of the exhaust pipe and are recorded synchronously with the combined signals, and in that to determine the clean propeller pressure signal, at least said cylinder exhaust signals are adjusted to the correct amplitude, similar edges of the combined signals and of the cylinder exhaust signals corresponding to the respective combined signals are brought into coincidence and the cylinder exhaust signals of the engine are subtracted from the combined signals by electronic.

DESCRIPTION OF THE PREFERRED EMBODIMENT

Figure 2:
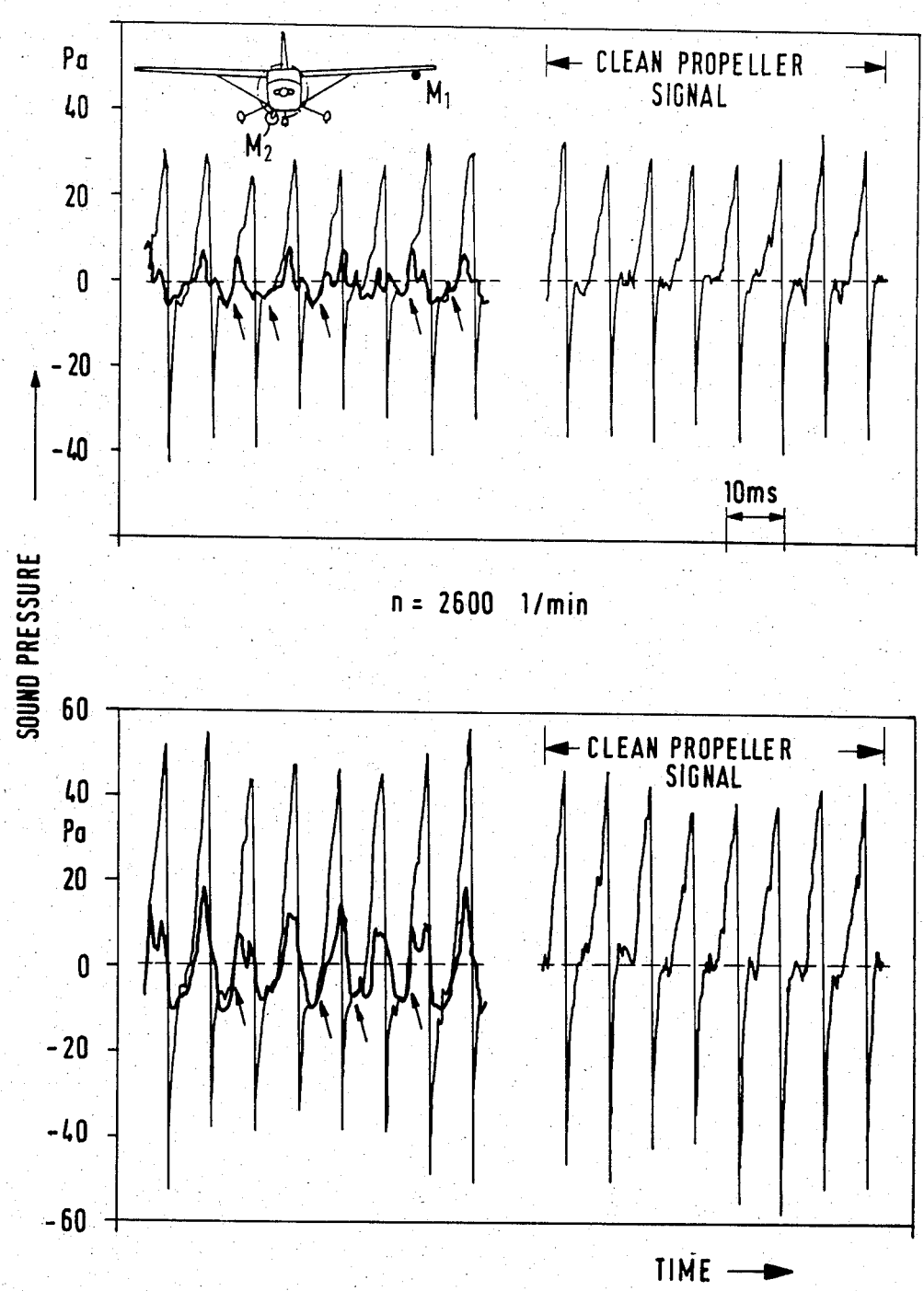
FIG. 2 illustrates the combined propeller and exhaust signals and the clean propeller signals of the aircraft.
Figure 3:
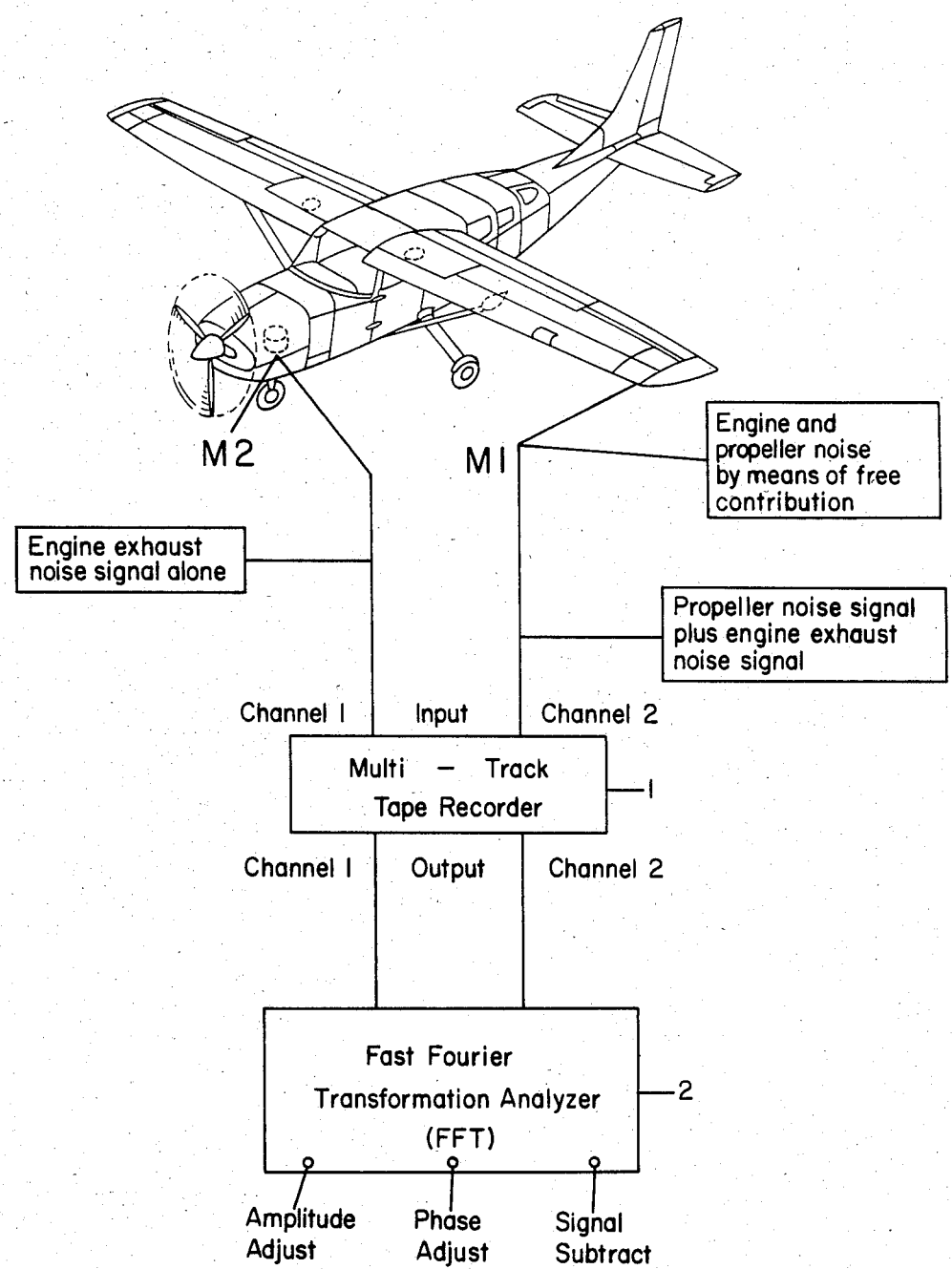
FIG. 3 is a schematic view of the apparatus of the instant invention.

Performance of the method, involved arranging a first microphone probe $M_1$ in front of the wings of an aircraft. A second microphone probe $M_2$ was fitted very close alongside the engine exhaust, at a distance approximately of 20 cm from the mouth of the engine exhaust, as is shown in FIG. 2, top left. With smaller engine the microphone can be fitted even closer to said engine exhaust. During testing, the first microphone $M_1$ was arranged in the area at the end of the portside wing tip, on a carrier at a distance of approximately 1 m behind the plane of rotation of the propeller. Microphones of similar design were used, each of the microphones being fitted with a nose cone.

Signals received by the first microphone are a combination of propeller noise and cylinder exhaust noise. The second microphone basicly only receives the cylinder exhaust noise. The signals detected by the two microphones were recorded synchronously on a multi-track tape recorder. The signals are recorded with various engine performances.

Analysis of the engine exhaust signal measured in flight with the microphone probe arranged alongside the engine exhaust by monitoring revealed that the exhaust signal or signature of each individual cylinder is identifiable in the exhaust signal. It is assumed that the signal produced by the escaping exhaust gases possesses a special "characteristic" for each cylinder caused by individual reflection in the exhaust pipe and various path length through to its mouth.

The sequential times of the combined signals are equal $1/(B·n)=2/(Z·n)$, where $B=$number of propeller blades, $Z=$number of cylinders and $n=$rotational speed (1/min). Furthermore, the signals are in phase and therefore their greater parts are superimposed in the direction of time.

In the time sequence, the pressure signal of a propeller blade in turn encounters the pressure signal of one of two possible cylinders. The complete cycle of the four stroke engine corresponds to two shaft rotations. The pressure signal of the propeller blade recurs with period $1/n$.

Figure 1:
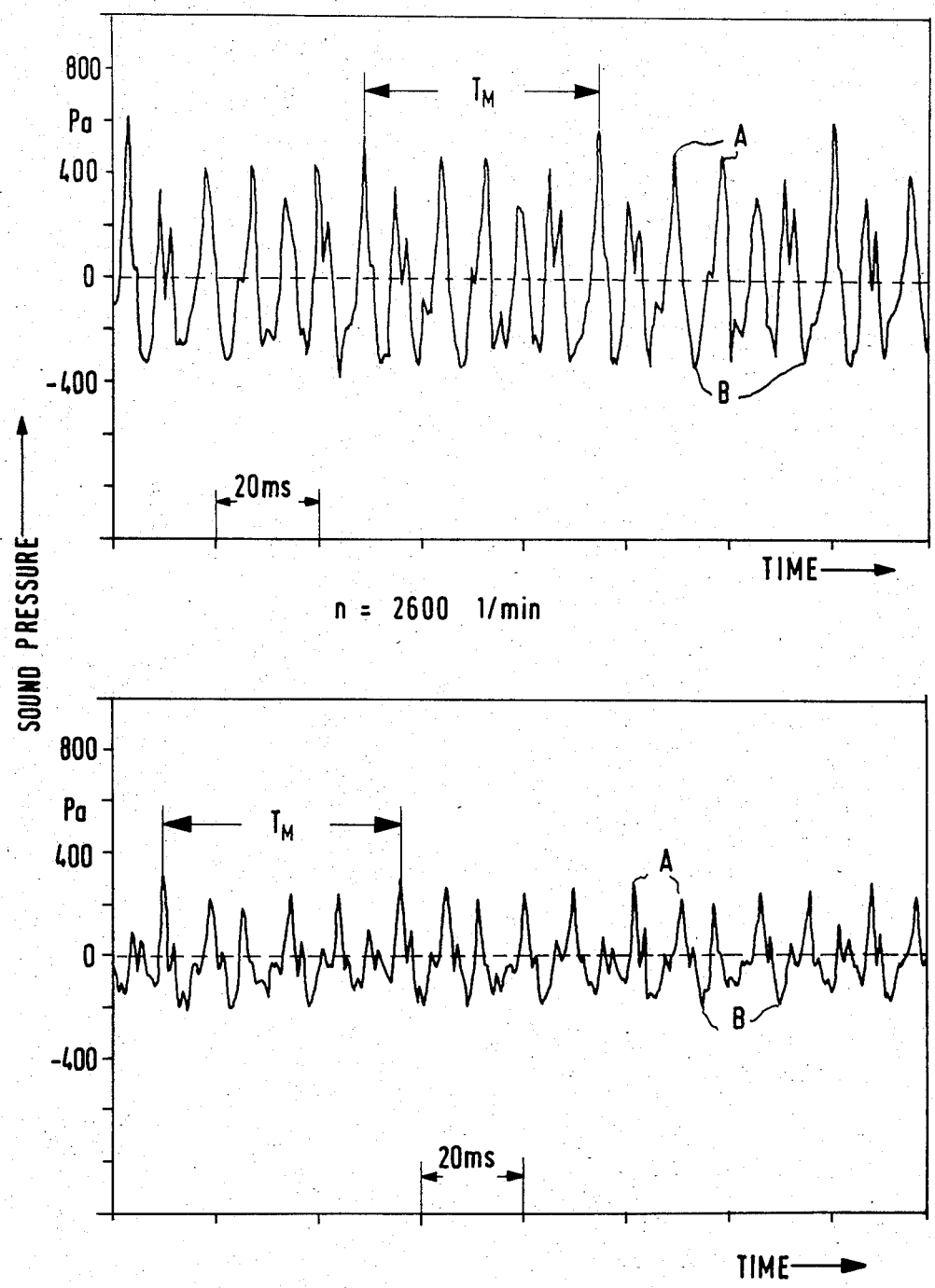
FIG. 1 illustrates the exhaust signals of an aircraft engine.

In FIG. 1 the exhaust pressure signals of a six cylinder engine—in this case a Teledyne-Continental TS10-520-M engine—are shown for two different performances of the engine, and with sound pressure plotted against time. Engine speed was equal to $n=2600$ 1/min.

The complete operational cycle of the engine is represented in both diagrams as time $T_M 2/n$.

It can clearly be seen from each of the two diagrams that each cylinder has an individual "characteristic" mentioned above. In the diagrams, arrows A and B are used by way of example to refer to identifying characteristics for positive pressure parts—arrows A—and negative pressure parts of one of the six cylinders of the engine.

The engine exhaust signals detected by microphone $M_2$ are to be subtracted from the combined signal detected by microphone $M_1$. An appropriate phase signal subtraction can best be achieved by means of a two channel Fourier transformation analyzer (FFT), as parts of the exhaust pressure signal in the combined signal are easily optically detectable. The time delay can also be determined with the aid of a cross correlation between $M_1$ and $M_2$.

Since the combined signal is measured by microphone $M_1$ at a point on the aircraft which is very much further away from the source of the exhaust signal than the microphone probe $M_2$ which is very close alongside the mouth of the exhaust of the engine, the exhaust signal must be adjusted in amplitude prior to subtraction. The degree of amplitude adjustment can be determined by a known decaying law as a function of the position of the microphone $M_1$ in the near or far field relative to the mouth of the exhaust of the engine. This presupposes undisturbed propagation. The safest and most simple method is to adjust the amplitude of the exhaust signal of the engine directly on the screen of the FFT using the visible characteristic features of the exhaust signal.

In FIG. 2 the combined signals—thin lines—are shown in the left hand parts of the two diagrams for low engine performance—upper diagram—and high engine performance—lower diagram—. The engine exhaust signals—thick lines—are here shown superimposed on these combined signals after adjustment. Phase adjustment is achieved in such a way that similar signatures or time histories in both signals are brought into coincidence. In the diagrams according to FIG. 2 coinciding signatures are indicated by arrows. After bringing the two signatures into coincidence in the described way by means of the FFT, signal subtraction is carried out by electronic means. In this way finally the clean propeller signal is achieved, which is shown in the right hand part of the diagrams in FIG. 2. In this way the clean propeller signal is determined both quantitatively and in a way which can be reproduced. The individual characteristic of each cylinder ensures that a subtraction takes place from that part of the combined signal caused by the cylinder concerned.

This method can be used by way of example in the development of propeller blades to determine quantitatively the effects of individual development steps by comparing clean propeller pressure signals obtained for each step. Research and development work with the aim to reduce the magnitude of the propeller pressure signal is thereby facilitated considerably. This method makes further possible the determination of the clean propeller signal as a basis for a propeller aircraft noise certification.

What we claim as our invention and desire to secure by Letters Patent of the United States is:

1. A method of determining the propeller pressure signal of a propeller-driven aircraft powered by a four-stroke internal combustion engine comprising:
   a. recording a combined propeller and exhaust signal from said aircraft during the flight of said aircraft, said combined signal consisting of a series of successive propeller signals and a series of successive combustion signals from individual cylinders of said engine;
   b. simultaneously recording an exhaust signal from said aircraft, said exhaust signal consisting of a series of successive combustion signals from individual cylinders of said engine and being measured adjacent the exhaust pipe of said engine;
   c. adjusting the amplitude of at least one of said combined signal and said exhaust signal so that the amplitude of said exhaust signal is substantially the same as the amplitude of the exhaust signal portion of said combined signal;
   d. adjusting the phase of at least one of said combined signal and said exhaust signal so that said combined and exhaust signals are in phase with each other; and
   e. thereafter subtracting said exhaust signal from said combined signal to determine said propeller pressure signal.

2. In the method of claim 1, said combined signal recording step further characterized as recording a combined propeller and exhaust signal measured by a first microphone, said exhaust signal recording step further characterized as recording an exhaust signal measured by a second microphone.

3. The method of claim 1 further characterized in that both said combined signal and said exhaust signal are adjusted in said amplitude and phase adjusting steps.

4. In the method of claim 1, said phase adjusting step further characterized as adjusting the phase of at least one of said combined signal and said exhaust signal by bringing similar edges of said signals into coincidence.

5. An apparatus for determining the propeller pressure signal of a propeller-driven aircraft powered by a four-stroke engine comprising:
   a. a first microphone mounted on said aircraft closely behind the plane of rotation of the propeller thereof for sensing a combined propeller and exhaust signal from said aircraft consisting of a combination of a series of successive propeller signals and a series of successive exhaust signals from individual cylinders of said engine;
   b. a second microphone mounted on said aircraft adjacent the mouth of the exhaust pipe thereof for sensing an exhaust signal from said aircraft consisting of a series of successive exhaust signals from individual cylinders of said engine;
   c. means for recording the combined signal from said first microphone and for simultaneously recording the exhaust signal from said second microphone;
   d. means for adjusting the amplitude of one of said exhaust signal or said combined signal so that the amplitude of said exhaust signal is substantially the same as the amplitude of the exhaust signal portion of said combined signal and for adjusting at least one of said combined signal and said exhaust signal so that they are in phase with each other; and
   e. means for subtracting said exhaust signal from said combined signal to determine said propeller pressure signal.

6. In the apparatus of claim 5, said adjusting means further characterized as adjusting said signals so that they are in phase by bringing similar edges of said signals into coincidence.

7. In the apparatus of claim 6, said means for adjusting said signals so that they are in phase comprising a two-channel Fourier transformation analyzer.

* * * * *